United States Patent [19]

Khodsky et al.

[11] 4,193,808

[45] Mar. 18, 1980

[54] ENAMEL FOR COATING STEEL ARTICLES

[75] Inventors: Lev G. Khodsky; Alla I. Brazgovskaya; Valentina S. Kaminskaya, all of Minsk, U.S.S.R.; Evgeny N. Podkletnov, deceased, late of Moscow, U.S.S.R., by Vera M. Malkina, Evgeny E. Podkletnov, administrators

[73] Assignee: Institut Obschei i Neorganicheskoi Khimii Akademii Nauk Belorusskoi SSR, U.S.S.R.

[21] Appl. No.: 773,753

[22] Filed: Mar. 2, 1977

[51] Int. Cl.$^2$ ............................ C03C 3/04; C03C 7/02
[52] U.S. Cl. ........................................... 106/48; 106/52
[58] Field of Search ........................................ 106/52, 48

[56] References Cited

U.S. PATENT DOCUMENTS

| | | | |
|---|---|---|---|
| 2,010,776 | 8/1935 | Frost | 106/48 |
| 2,347,187 | 4/1944 | Frost | 106/48 |
| 3,098,753 | 7/1963 | Van Dolah et al. | 106/48 |
| 3,365,315 | 1/1968 | Beck | 106/52 |
| 3,507,687 | 4/1970 | Laird | 106/48 |
| 3,556,821 | 1/1971 | Hanzlik | 106/48 |
| 3,836,373 | 9/1974 | Ault et al. | 106/48 |
| 3,861,926 | 1/1975 | Irlam | 106/52 |
| 3,969,121 | 7/1976 | Atkinson | 106/52 |

Primary Examiner—O. R. Vertiz
Assistant Examiner—Mark Bell
Attorney, Agent, or Firm—Robert E. Burns; Emmanuel J. Lobato; Bruce L. Adams

[57] ABSTRACT

An enamel for coating steel articles is disclosed comprising $SiO_2$, $TiO_2$, $ZrO_2$, $CaF_2$, LiO and $Na_2O$ with the following ratio of the components, in percent by weight:

| | |
|---|---|
| $SiO_2$ | 62.17 to 72.29 |
| $TiO_2$ | 0.2 to 9.54 |
| $ZrO_2$ | 0.5 to 9.9 |
| $CaF_2$ | 2.4 to 6.6 |
| $Li_2O$ | 0.3 to 5.06 |
| $Na_2O$ | 10.48 to 19.05 |

The enamel may also comprise $Cr_2O_3$ or $Co_2O_3$ in an amount of 0.5 to 2 percent by weight. The oxides ensure the preparation of an enamel of a green or blue color, respectively. The enamel efficiently protects steel articles from aggressive media, i.e. acids and alkalis and the enamel coating has good luster and high continuity, without pinholes.

3 Claims, No Drawings

ENAMEL FOR COATING STEEL ARTICLES

BACKGROUND OF THE INVENTION

The present invention relates to enamels for coating steel articles with a view to afford protection to same from the effect of aggressive media such as acids and alkalis. The aforesaid steel articles can be pipes, reactors, heat exchangers and other vessels.

The prior art teaches an enamel for coating steel articles comprising $SiO_2$, $Al_2O_3$, $CaO$, $Na_2O$, $K_2O$, $B_2O_3$, $TiO_2$, $Li_2O$, $ZrO_2$, $CaF_2$, $CuO$ and $SrO$ with the following ratio of said components, in percent by weight:

| | |
|---|---|
| $SiO_2$ | 50 to 80 |
| $Al_2O_3$ | 0.5 to 6 |
| $CaO$ | 0.2 to 5 |
| $Na_2O$ | 7 to 20 |
| $K_2O$ | up to 5 |
| $B_2O_3$ | 0.2 to 6 |
| $TiO_2$ | up to 5 |
| $Li_2O$ | 0.2 to 5 |
| $ZrO_2$ | 0.2 to 10 |
| $CaF_2$ | 0.2 to 7 |
| $CuO$ | 0.5 to 20 |
| $SrO$ | 0.2 to 10 |

The disadvantages of the enamel known in the art are the use of a large number of components, as well as a large amount of copper oxide which may result in metallization of the coating and deterioration of its protective properties. In addition, copper oxide is toxic.

SUMMARY OF THE INVENTION

It is an object of the present invention to prepare such enamel for coating steel articles which would comprise a considerably smaller number of components and would not require critical and toxic materials for its preparation, having at the same time high protective properties.

In accordance with the foregoing and other objects of the invention, there is proposed an enamel for coating steel articles comprising $SiO_2$, $TiO_2$, $ZrO_2$, $CaF_2$, $Li_2O$ and $Na_2O$ with the following ratio of said components, in percent by weight:

| | |
|---|---|
| $SiO_2$ | 62.17 to 72.29 |
| $TiO_2$ | 0.2 to 9.54 |
| $ZrO_2$ | 0.5 to 9.9 |
| $CaF_2$ | 2.4 to 6.6 |
| $Li_2O$ | 0.3 to 5.06 |
| $Na_2O$ | 10.48 to 19.05 |

DESCRIPTION OF THE PREFERRED EMBODIMENTS

The enamel of the invention differs from known enamel in that it comprises half as many components and does not contain the critical boron oxide and toxic copper oxide. The enamel has a high acid resistance and alkali resistance and makes it possible to prepare a high-quality coating, without pinholes.

It is recommended to use an enamel having the following composition, in percent by weight:

| | |
|---|---|
| $SiO_2$ | 68.0 |
| $TiO_2$ | 3.23 |
| $ZrO_2$ | 4.95 |
| $CaF_2$ | 6.32 |
| $Li_2O$ | 2.5 |
| $Na_2O$ | 15.0 |

The enamel of said composition has the highest acid and alkali resistance and forms the highest-quality coating (continuous, without pinholes) on steel articles.

The enamel may contain in its composition such components as $Cr_2O_3$ or $Co_2O_3$ in an amount of 0.5 to 2 percent by weight. The oxides make it possible to produce the enamel of a green blue color, respectively.

The proposed enamel is prepared in the following manner.

First a batch is prepared, the batch components being the following substances:
(1) silica sand or pure silicon dioxide;
(2) titanium dioxide;
(3) zircon concentrate $ZrSiO_4$;
(4) fluorspar;
(5) lithium carbonate;
(6) soda.

The content of the components in the batch is determined by the content of oxides in the enamel.

The batch components are proportioned, mixed and completely melted in rotary or hearth-type furnaces at a temperature of 1,300° to 1,350° C. The melted enamel is fritted by pouring it in to water or passing through rolls. Thereafter the fritted enamel is dried at a temperature of 100° to 120° C. and a dross is prepared. For this purpose the fritted enamel is charged into a ball mill adding thereto clay in an amount of 5 to 7 percent by weight of the frit, an electrolyte such as ammonium chloride and or ammonium molybdate and molybdenum anhydride, in an amount of 0.5 to 1 percent by weight of the frit, chromium oxide or cobalt oxide, if necessary, in an amount of 0.5 to 2 percent by weight of the frit, and water in an amount of 40 to 50 percent by weight of the frit. The resultant mass is subjected to grinding to a requisite fineness, e.g. that of 1.4 to 1.7 cm (by the method of settling in a Lisenko cylinder).

The prepared dross is applied to pre-primed steel articles by a method of dipping or spraying and the enamel coating is dried at a temperature of 20° to 120° C. The dried coating is subjected to calcination at a temperature of 820° to 860° C. in electric furnaces or in induction units.

For obtaining a continuous (without pinholes) enamel coating it is necessary to apply the dross to the articles at least three times, drying and calcining the coating after each application.

For a better understanding of the present invention the following examples of producing the proposed enamel are given.

EXAMPLE 1

A batch of the following composition is prepared as calculated per 100 parts by weight of the enamel:

| | |
|---|---|
| silica sand | 59.84 |
| titanium dioxide | 9.54 |
| zircon concentrate $ZrSiO_4$ | 7.28 |
| fluorspar | 6.21 |
| lithium carbonate | 5.88 |
| soda | 25.31 |
| | 114.06 |

The batch components are proportioned, mixed and melted in a rotary furnace at a temperature of 1,300° to 1,320° C. till complete melting thereof. The melted enamel is fritted by pouring it in to water. Thereafter the fritted enamel is dried at a temperature of 100° to 120° C. and a dross is prepared. For this purpose there are charged into a ball mill 100 parts by weight of the enamel frit, 5 parts by weight of clay, one part by weight of ammonium molybdate, and 42.0 parts by weight of water. The resultant mass is subjected to grinding to a requisite fineness, e.g. that of 1.4 cm (by the method of settling in a Lisenko cylinder).

The prepared dross is applied to pre-primed steel articles and the enamel coating is dried at a temperature of 20° C. to 120°. The dried coating is calcined in an electric furnace at a temperature of 860° C.

For obtaining a continuous (without pinholes) enamel coating the dross is applied to the articles three times, drying and calcining the coating after each application.

The resultant coating (enamel) has the following composition, in percent by weight:

| | |
|---|---|
| $SiO_2$ | 62.17 |
| $TiO_2$ | 9.54 |
| $ZrO_2$ | 4.9 |
| $CaF_2$ | 6.21 |
| $Li_2O$ | 2.38 |
| $Na_2O$ | 14.8 |
| | 100 |

Physical and chemical characteristics of the enamel:

| | |
|---|---|
| coeffiecient of linear expansion ($\alpha$), in degrees$^{-1}$ | $87.10^{-7}$ |
| calcination range, in °C. | 845 to 915 |
| heat resistance, in °C. | 200 |
| leachability, in mg/cm$^2$,of the enamel coating after keeping a steel article with a coating for four hours in boiling aqueous solutions: | |
| (1) a 20, 24% aqueous solution of hydrochloric acid | 0.11 |
| (2) a 2 N aqueous solution of sodium hydroxide | 0.47 |

The resultant enamel coating has a light gray color and is distinguished by good luster and high continuity.

EXAMPLE 2

The preparation of the enamel and its application to steel articles is carried out in a manner similar to that set forth in Example 1.

The patch composition, in parts by weight (as calculated per 100 parts by weight of the enamel):

| | |
|---|---|
| silica sand | 60.18 |
| titanium dioxide | 0.2 |
| zircon concentrate | 14.72 |
| fluorspar | 5.7 |
| lithium carbonate | 5.85 |
| soda carbonate | 25.27 |
| | 111.92 |

The dross composition, in parts by weight:

| | |
|---|---|
| enamel frit | 100 |
| clay | 7 |
| ammonium chloride | 0.5 |
| chronium oxide $Cr_2O_3$ | 2 |
| water | 50 |
| | 158.5 |

The enamel composition, in percent by weight:

| | |
|---|---|
| $SiO_2$ | 65.05 |
| $TiOl_2$ | 0.2 |
| $ZrO_2$ | 9.9 |
| $CaF_2$ | 5.7 |
| $Li_2O$ | 2.37 |
| $Na_2O$ | 14.78 |
| $Cr_2O_3$ | 2 |
| | 100 |

Physical and chemical characteristics of the enamel:

| | |
|---|---|
| coefficient of linear expansion ($\alpha$), in degrees$^{-1}$ | $102.10^{-}$ |
| calcination range, in °C. | 840 to 900 |
| heat resistance, in °C. | 210 |
| leachability, in mg/cm$^2$, of the enamel coating after keeping a steel article with a coating for four hours in boiling aqueous solutions: | |
| (1) a 20, 24% aqueous solution of hydrochloric acid | 0.13 |
| (2) a 2N aqueous solution of sodium hydroxide | 0.48 |

The resultant enamel coating has a green colour and good luster and high continuity.

EXAMPLE 3

The preparation of the enamel and its application to steel articles is carried out in a manner similar to that set forth in Example 1.

The batch composition, in parts by weight (as calculated per 100 parts by weight of the enamel):

| | |
|---|---|
| silica sand | 57.86 |
| titanium dioxide | 6.25 |
| zircon concentrate | 13.64 |
| fluorspar | 2.40 |
| lithium carbonate | 0.74 |
| soda | 32.57 |
| | 113.46 |

The dross composition, in parts by weight:

| | |
|---|---|
| enamel frit | 100 |
| clay | 5 |
| ammonium chloride | 0.1 |
| ammonium molybdate | 0.2 |
| molybdenum anhydride | 0.4 |
| chromium oxide $Cr_2O_3$ | 0.5 |
| water | 47.0 |
| | 153.2 |

The enamel composition, in percent by weight:

| | |
|---|---|
| $SiO_2$ | 62.33 |
| $TiO_2$ | 6.25 |
| $ZrO_2$ | 9.17 |
| $CaF_2$ | 2.40 |
| $Li_2O$ | 0.3 |
| $Na_2O$ | 19.05 |
| $Cr_2O_3$ | 0.5 |
| | 100 |

Physical and chemical characteristics of the enamel:

| | |
|---|---|
| coefficient of linear expansion ($\alpha$), in degrees$^{-1}$ | $95.10^{-7}$ |
| calcination range, in °C. | 830 to 900 |
| heat resistance, in °C. | 200 |
| leachability, in mg/cm$^2$, of the enamel coating after keeping a steel article with a coating for four hours in boiling aqueous solutions: | |
| (1) a 20, 24% aqueous solution of hydrochloric acid | 0.12 |
| (2) a 2N aqueous solution of sodium hydroxide | 0.45 |

The resultant enamel coating has a light green colour and good luster and high continuity.

EXAMPLE 4

The preparation of the enamel and its application to steel articles is carried out in a manner similar to that set forth in Example 1.

The batch composition, in parts by weight (as calculated per 100 parts by weight of the enamel):

| | |
|---|---|
| silica sand | 72.05 |
| titanium dioxide | 2.32 |
| zircon concentrate | 0.74 |
| fluorspar | 6.48 |
| lithium carbonate | 6.13 |
| soda | 26.38 |
| | 114.10 |

The dross composition, in parts by weight:

| | |
|---|---|
| enamel frit | 100 |
| clay | 6.0 |
| ammonium chloride | 0.5 |
| cobalt oxide Co$_2$O$_3$ | 0.5 |
| water | 40 |
| | 147 |

The enamel composition, in percent by weight:

| | |
|---|---|
| SiO$_2$ | 72.29 |
| TiO$_2$ | 2.32 |
| ZrO$_2$ | 0.5 |
| CaF$_2$ | 6.48 |
| Li$_2$O | 2.48 |
| Na$_2$O | 15.43 |
| Co$_2$O$_3$ | 0.5 |
| | 100 |

Physical and chemical characteristics of the enamel:

| | |
|---|---|
| coefficient of linear expansion ($\alpha$), in degrees$^{-1}$ | $99.10^{-7}$ |
| calcination range, in °C. | 845 to 915 |
| heat resistance, in °C. | 220 |
| leachability, in mg/cm$^2$, of the enamel coating after keeping a steel article with a coating for hours in boiling aqueous solutions: | |
| (1) a 20, 24% aqueous solution of hydrochloric acid | 0.09 |
| (2) a 2N aqueous solution of sodium hydroxide | 0.47 |

The resultant enamel coating has a light blue color and good luster and high continuity.

EXAMPLE 5

The preparation of the enamel and its application to steel articles is carried out in a manner similar to that set forth in Example 1.

Composition of the batch, in parts by weight (as calculated per 100 parts by weight of the enamel):

| | |
|---|---|
| silica sand | 65.59 |
| titanium dioxide | 3.23 |
| zirconium concentrate | 7.36 |
| fluorspar | 6.32 |
| lithium carbonate | 6.20 |
| soda | 25.65 |
| | 114.35 |

Composition of the dross, in parts by weight:

| | |
|---|---|
| enamel frit | 100 |
| clay | 5 |
| molybdenum anhydride | 0.5 |
| ammonium chloride | 0.5 |
| water | 45 |
| | 151.0 |

Composition of the enamel, in percent by weight:

| | |
|---|---|
| SiO$_2$ | 68.0 |
| TiO$_2$ | 3.23 |
| ZrO$_2$ | 4.95 |
| CaF$_2$ | 6.32 |
| Li$_2$O | 2.5 |
| Na$_2$O | 15.0 |
| | 100 |

Physical and chemical characteristics of the enamel:

| | |
|---|---|
| coefficient of linear expansion ($\alpha$), in degrees$^{-1}$ | $98.10^{-7}$ |
| calcination range, in °C. | 800 to 920 |
| heat resistance, in °C. | 250 |
| leachability, in mg/cm$^2$, of the enamel coating after keeping a steel article with a coating for four hours in boiling aqueous solutions: | |
| (1) a 20,24% aqueous solution of hydrochloric acid | 0.06 |
| (2) 1 2N aqueous solution of sodium hydroxide | 0.42 |
| leachability, in mg/cm$^2$, of the enamel coating after its consecutive treatment with a 20,24% aqueous solution of hydrochloric acid and a 2N aqueous solution of sodium hydroxide at a temperature of 96° C. and with the duration of each treatment of three hours; said treatment cycles "acid-alkali" are conducted 6 times | 3.7 |

The resultant enamel was tested for acid resistance according to JTE/13 in liquid and vapor phases of 20,24% aqueous solution of hydrochloric acid at the solution boiling temperature for 48 hours. The results of the test are given in Table 1.

Table 1

| Test medium | Leachability of the enamel | | |
| --- | --- | --- | --- |
| | mg/cm² | g/(m²·day) | mm/year |
| Liquid phase | 0.13 | 0.65 | 0.09 |
| Vapor phase | 0.20 | 1.00 | 0.14 |

The enamel was also tested for alkali resistance according to DIN/51156 in a 4% aqueous solution of sodium hydroxide at a temperature of 80° C. for 48 hours. The test results are given in Table 2.

Table 2

| Leachability of the enamel | | |
| --- | --- | --- |
| mg/cm² | g/(m²·day) | mm/year |
| 0.44 | 2.2 | 0.32 |

The resultant enamel has a light gray colour with addition of 1 wt. % of $Cr_2O$ of light green colour, and 0.5 wt.% of light blue colour and good luster and high continuity.

EXAMPLE 6

The preparation of the enamel and its application to steel articles is conducted in the same way as in Example 1.

Composition of the batch, in parts by weight (as calculated per 100 parts by weight of the enamel):

| | |
| --- | --- |
| silica sand | 70.36 |
| titanium dioxide | 6.76 |
| zircon concentrate | 0.74 |
| fluorspar | 6.6 |
| lithium carbonate | 12.5 |
| soda | 17.35 |
| | 114.31 |

Composition of the dross, in parts by weight:

| | |
| --- | --- |
| enamel frit | 100 |
| clay | 5.5 |
| ammonium chloride | 0.5 |
| water | 42.5 |
| | 148.5 |

Composition of the enamel, in percent by weight:

| | |
| --- | --- |
| $SiO_2$ | 70.60 |
| $TiO_2$ | 6.76 |
| $ZrO_2$ | 0.5 |
| $CaF_2$ | 6.6 |
| $Li_2O$ | 5.06 |
| $Na_2O$ | 10.48 |
| | 100 |

Physical and chemical characteristics of the enamel:

| | |
| --- | --- |
| coefficient of linear expansion ($\alpha$), in degrees$^{-1}$ | $90.10^{-7}$ |
| Calcination range, in °C. | 840 to 910 |
| heat resistance, in °C. | 210 |
| leachability, in mg/cm², of the enamel coating after keeping a steel article with a coating for four hours in boiling aqueous solutions: | |
| (1) a 20,24% aqueous solution of hydrochloric acid | 0.11 |
| (2) a 2N aqueous solution of sodium hydroxide | 0.43 |

The resultant enamel has a light gray colour (with addition of 1 wt.% of $Cr_2O_3$ of light green colour, and 0.5 wt.% of light blue colour) and good luster and high continuity.

EXAMPLE 7

The preparation of the enamel and its application to steel articles is conducted in the same way as in Example 1.

Composition of the charge, in parts by weight (as calculated per 100 parts by weight of the enamel):

| | |
| --- | --- |
| silica sand | 67.95 |
| titanium dioxide | 1.53 |
| zircon concentrate | 9.37 |
| fluorspar | 3.2 |
| lithium carbonate | 10.29 |
| soda | 21.72 |
| | 114.06 |

Composition of the dross, in parts by weight:

| | |
| --- | --- |
| enamel frit | 100 |
| clay | 6 |
| ammonium chloride | 0.1 |
| ammonium molybdate | 0.2 |
| molybdate anhydride | 0.4 |
| cobalt oxide $Co_2O_3$ | 1.0 |
| water | 47.0 |
| | 154.7 |

Composition of the enamel, in percent by weight:

| | |
| --- | --- |
| $SiO_2$ | 71.10 |
| $TiO_2$ | 1.53 |
| $ZrO_2$ | 6.3 |
| $CaF_2$ | 3.2 |
| $Li_2O$ | 4.17 |
| $Na_2O$ | 12.7 |
| $Co_2O_3$ | 1.0 |
| | 100 |

Physical and chemical characteristics of the enamel:

| | |
| --- | --- |
| coefficient of linear expansion ($\alpha$), in degrees$^{-1}$ | $93.10^{-7}$ |
| calcination range, in °C. | 840 to 900 |
| heat resistance, in °C. | 200 |
| leachability, in Mg/cm², of the enamel coating after keeping a steel article with a coating for four hours in boiling aqueous solutions: | |
| (1) a 20,24% aqueous solution of hydrochloric acid | 0.12 |
| (2) a 2N aqueous solution of sodium hydroxide | 0.43 |

The resultant enamel coating has a blue colour and good luster and high continuity.

What is claimed is:

1. An enamel composition for coating steel articles, consisting essentially of comprising $SiO_2$, $TiO_2$, $ZrO_2$, $CaF_2$, $Li_2O$ and $Na_2O$ with the following ratio of said components, in percent by weight:

| | |
|---|---|
| $SiO_2$ | 62.17 to 72.29 |
| $TiO_2$ | 0.2 to 9.54 |
| $ZrO_2$ | 0.5 to 9.9 |
| $CaF_2$ | 2.4 to 6.6 |
| $Li_2O$ | 0.3 to 5.06 |
| $Na_2O$ | 10.48 to 19.05 |

2. An enamel composition according to claim 1, consisting essentially of $SiO_2$, $TiO_2$, $ZrO_2$, $CaF_2$, $Li_2O$ and $Na_2O$ with the following ratio of said components, in percent by weight:

| | |
|---|---|
| $SiO_2$ | 68.0 |
| $TiO_2$ | 3.23 |
| $ZrO_2$ | 4.95 |
| $CaF_2$ | 6.32 |
| $Li_2O$ | 2.5 |
| $Na_2O$ | 15.0 |

3. An enamel composition according to claim 1, which further includes a metal oxide selected from the group consisting of $Cr_2O_3$ and $Co_2O_3$ in an amount of 0.5 to 2 percent by weight.

* * * * *